United States Patent
Umino et al.

(10) Patent No.: US 10,513,223 B2
(45) Date of Patent: Dec. 24, 2019

(54) VIEWING DEVICE FOR A VEHICLE

(71) Applicant: KABUSHIKI KAISHA TOKAI-RIKA-DENKI-SEISAKUSHO, Aichi-ken (JP)

(72) Inventors: Kazuya Umino, Aichi-ken (JP); Shigeki Yoshida, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 169 days.

(21) Appl. No.: 15/793,242

(22) Filed: Oct. 25, 2017

(65) Prior Publication Data

US 2018/0118112 A1  May 3, 2018

(30) Foreign Application Priority Data

Oct. 31, 2016 (JP) ................................ 2016-213563

(51) Int. Cl.
*B60R 1/076* (2006.01)

(52) U.S. Cl.
CPC .................................. *B60R 1/076* (2013.01)

(58) Field of Classification Search
CPC .......... B60R 1/076; B60R 1/074; B60R 1/06; B60R 1/0617

USPC .................................................. 359/841, 844
See application file for complete search history.

(56) References Cited

U.S. PATENT DOCUMENTS

| | | | |
|---|---|---|---|
| 2003/0218812 A1* | 11/2003 | Foote | B60R 1/074 359/874 |
| 2006/0119960 A1* | 6/2006 | Yoshida | B60R 1/074 359/871 |
| 2013/0242423 A1* | 9/2013 | Palvoelgyi | B60R 1/074 359/841 |

FOREIGN PATENT DOCUMENTS

JP  2011-194924 A  10/2011

* cited by examiner

*Primary Examiner* — Jade R Chwasz
(74) *Attorney, Agent, or Firm* — Roberts Mlotkowski Safran Cole & Calderon P.C.

(57) ABSTRACT

In a door mirror device for a vehicle, an engaging ring that rotates together with a case is provided on an interior floor portion of the case. A restricting ring is provided at the upper side of the engaging ring and is urged toward the lower side by a coil spring. The restricting ring is movable to a side in an axial direction of a support shaft of a stand, but relative rotation of the restricting ring with respect to the support shaft is restricted. Therefore, in a state in which upper side protrusion portions of the engaging ring go out from restricting recess portions of the restricting ring, the restricting ring is moved toward the upper side. Consequently, movement of the case toward the upper side can be suppressed.

6 Claims, 4 Drawing Sheets

VIEWING DEVICE FOR A VEHICLE

CROSS-REFERENCE TO RELATED APPLICATION

This application claims priority under 35 USC 119 from Japanese Patent Application No. 2016-213563 filed Oct. 31, 2016, the disclosure of which is incorporated by reference herein.

BACKGROUND

Field of the Invention

The present disclosure relates to a viewing device for a vehicle in which a viewer aids viewing by an occupant of the vehicle.

Related Art

In a door mirror recited in Japanese Patent Application Laid-Open (JP-A) No. 2011-194924, a mirror assembly is supported to be rotatable about a shaft of a shaft holder. In this door mirror, when the mirror assembly is being rotated, a positioning protrusion of the mirror assembly disengages from a positioning recess in the shaft holder. In consequence, the mirror assembly may be moved to a side in a rotation axis direction of the mirror assembly.

SUMMARY

In consideration of the circumstances described above, a viewing device for a vehicle is provided that may suppress movement of a viewer to a side in a rotation axis direction of the viewer when the viewer is being rotated.

A viewing device for a vehicle according to a first aspect includes: a support body that is provided at a vehicle body side; a viewer that is rotatably supported at the support body, the viewer aiding viewing by an occupant of the vehicle; and a restricting member that engages with the viewer from one side in an axis direction of rotation of the viewer and restricts rotation of the viewer, the restricting member being moved to the one side in the axis direction of rotation of the viewer and rotation of the viewer to both sides in a rotation direction of the viewer being allowed due to a rotation load of a predetermined magnitude or greater being applied to the restricting member from the viewer.

According to the viewing device for a vehicle of the first aspect, the restricting member engages with the viewer from the one side in the viewer rotation axis direction and restricts rotation of the viewer. By the rotation load of the predetermined magnitude or greater being applied from the viewer to the restricting member, the restricting member is moved to the one side in the viewer rotation axis direction and rotation of the viewer is allowed. Thus, because the restricting member is moved to the one side in the viewer rotation axis direction when the viewer is to be rotated, movement of the viewer in a direction away from the support body when the viewer is being rotated can be suppressed.

In a viewing device for a vehicle according to a second aspect, in the viewing device for a vehicle according to the first aspect, the support body is provided with a support shaft that rotatably supports the viewer, rotation of the restricting member relative to the support shaft is regulated, the restricting member is movable in an axis direction of the support shaft, the restricting member engages with the viewer from one side in an axis direction of the support shaft and restricts rotation of the viewer, and the restricting member is moved to the one side in the axis direction of the support shaft by rotation of the viewer.

According to the viewing device for a vehicle of the second aspect, the viewer is rotatably supported at the support shaft of the support body, and rotation of the restricting member relative to the support shaft of the support body is regulated. Accordingly, rotation of the viewer is restricted by the restricting member engaging with the viewer from the one side in the support shaft axis direction. The restricting member is movable in the support shaft axis direction, and the restricting member is (can be) moved to the one side in the support shaft axis direction by rotation of the viewer. Therefore, when the viewer is being rotated relative to the support body, movement of the viewer to the one side in the support shaft axis direction, that is, to the opposite side from the side of the viewer at which the support body is disposed, can be suppressed.

A viewing device for a vehicle according to a third aspect, in the viewing device for a vehicle according to the first aspect or the second aspect, further includes an engaging member, wherein: rotation of the engaging member relative to the viewer is blocked; rotation of the engaging member relative to the restricting member is restricted in a state in which the engaging member is engaged with the restricting member; and the engaging member applies the rotation load to the restricting member by the viewer being rotated.

According to the viewing device for a vehicle of the third aspect, the rotation load is applied to the restricting member from the engaging member by the viewer being rotated. Therefore, it is sufficient to provide the engaging member with mechanical characteristics such as strength with respect to a reaction force in response to the rotation load applied to the restricting member from the engaging member, strength with respect to friction against the restricting member and the like, stiffness, abrasion resistance and so forth. Consequently, reductions in weight and the like of the viewer are possible.

A viewing device for a vehicle according to a fourth aspect, in the viewing device for a vehicle according to any one of the first to third aspects, further includes a blocker that is provided so as to be superposed with the restricting member in the axis direction of rotation of the viewer, the blocker blocking rotation of the viewer at a certain angle.

According to the viewing device for a vehicle of the fourth aspect, the blocker that blocks rotation of the viewer at the certain angle is provided so as to be superposed with the restricting member in the viewer rotation axis direction. As a result, an increase in size of the viewing device for a vehicle in the viewer rotation radius direction can be suppressed.

As described hereabove, the viewing device for a vehicle according to the aspects can suppress movement of a viewer to a side in a viewer rotation axis direction when the viewer is being rotated.

BRIEF DESCRIPTION OF THE DRAWINGS

An exemplary embodiment will be described in detail with reference to the following figures, wherein.

DETAILED DESCRIPTION

Figure 1A:
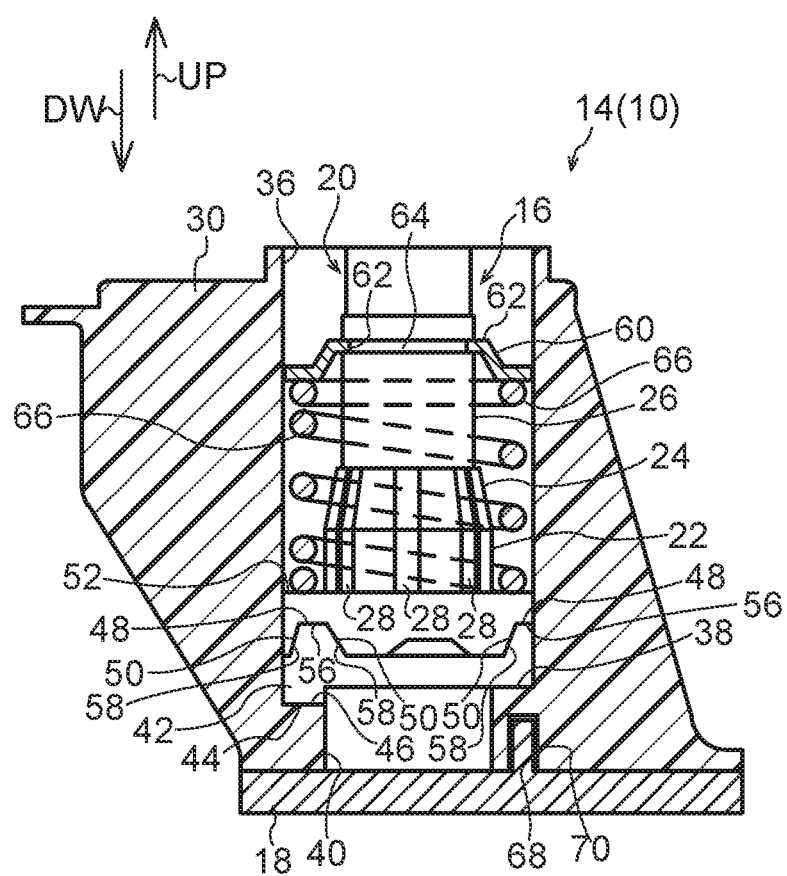
FIG. 1A is a sectional diagram in which a door mirror device for a vehicle according to an exemplary embodiment is seen from a front side of a case, showing a state in which upper side protrusion portions of an engaging ring are entered into restricting recess portions of a restricting ring.

Now, an exemplary embodiment is described in accordance with the drawings of FIG. 1A to FIG. 3. A door mirror device for a vehicle 10 serves as a viewing device for a vehicle according to the exemplary embodiment. The arrow OUT in the drawings indicates a vehicle width direction outer side of a vehicle in which the door mirror device for a vehicle 10 is employed, the arrow UP indicates the upper side of the vehicle, and the arrow DW indicates the lower side of the vehicle.

Structure of the Present Exemplary Embodiment

Figure 3:
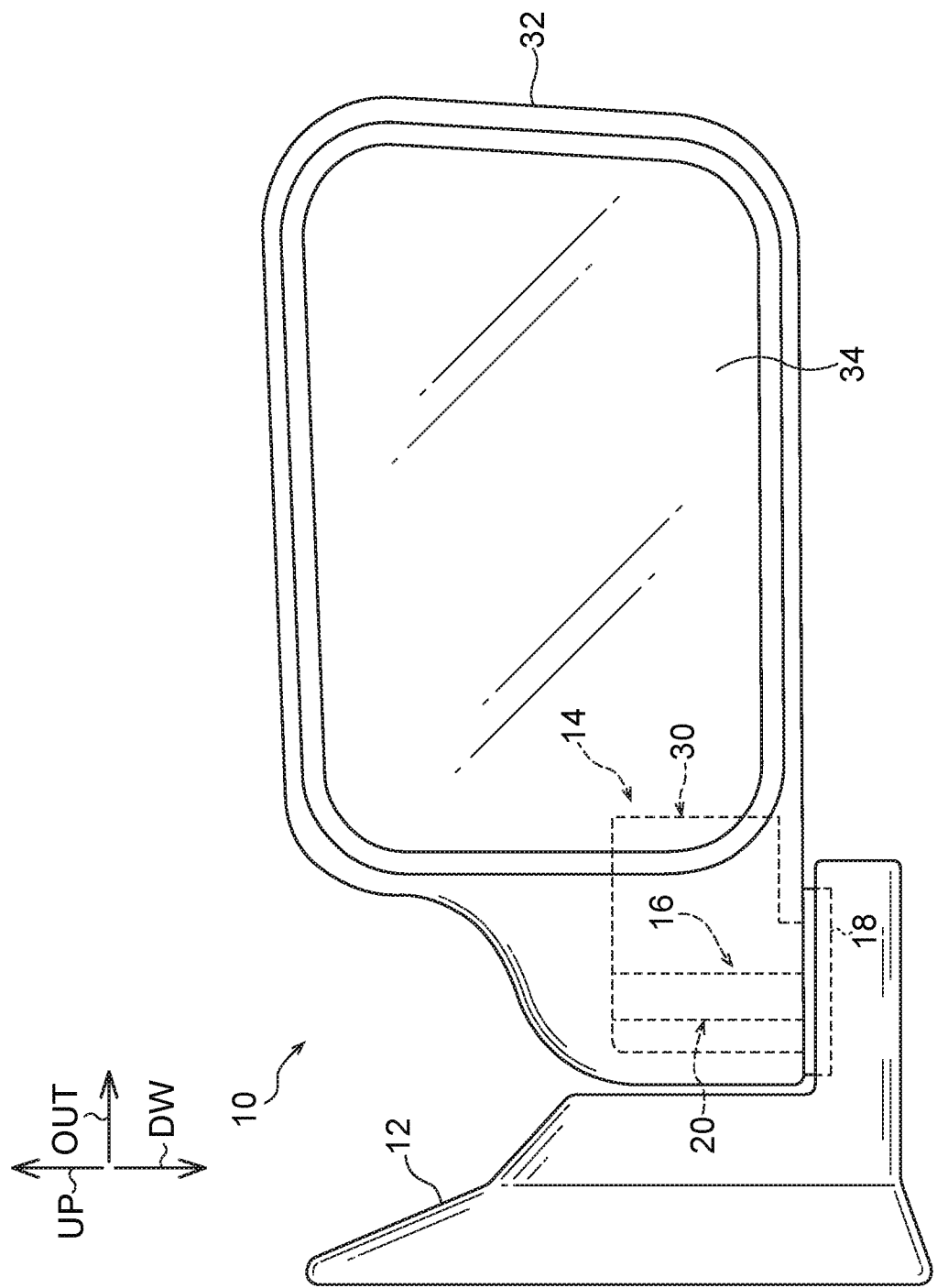
FIG. 3 is a view, seen from the vehicle rear side, of the door mirror device for a vehicle according to the exemplary embodiment in an expanded state.

As shown in FIG. 3, the door mirror device for a vehicle 10 is equipped with a stay 12 that serves as a disposition member. A vehicle width direction inner side portion of the stay 12 is fixed to a door of the vehicle. Thus, the door mirror device for a vehicle 10 is mounted to the door of the vehicle, at the outside of the vehicle. A folding (housing) mechanism 14 is provided at the upper side of a vehicle width direction outer side portion of the stay 12.

Figure 1B:
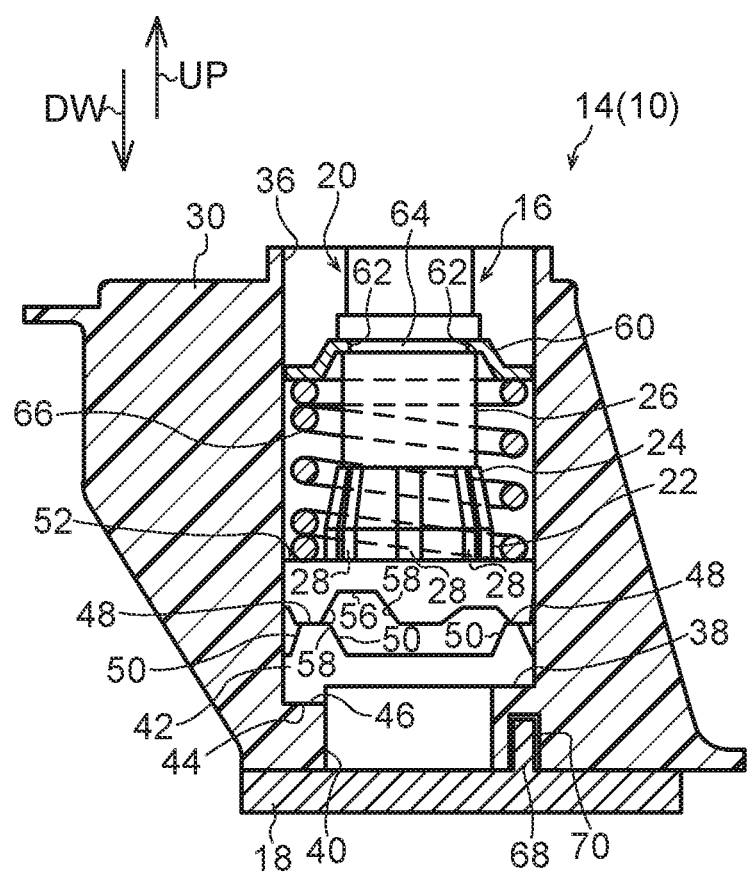
FIG. 1B is a sectional diagram in which the door mirror device for a vehicle according to the exemplary embodiment is seen from the front side of the case, showing a state in which the upper side protrusion portions are gone out from the restricting recess portions.
Figure 2:
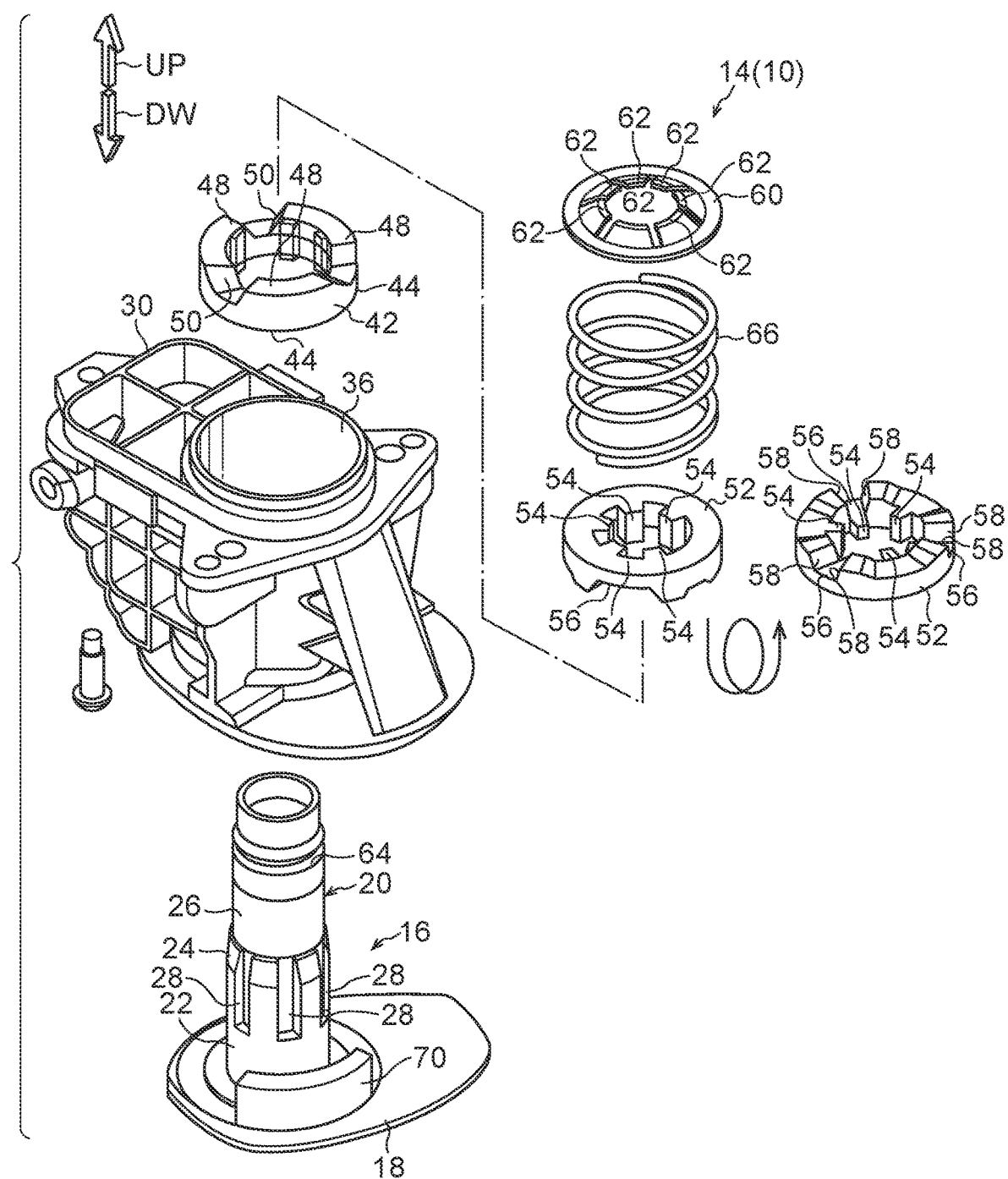
FIG. 2 is an exploded perspective view of a folding mechanism of the door mirror device for a vehicle according to the exemplary embodiment.

As illustrated in FIG. 1A, FIG. 1B and FIG. 2, the folding mechanism 14 is equipped with a stand 16 that serves as a support body. The stand 16 is equipped with a fixed portion 18. The fixed portion 18 is fixed to the stay 12 shown in FIG. 3. As shown in FIG. 1A, FIG. 1B and FIG. 2, the stand 16 is also equipped with a support shaft 20. The support shaft 20 is provided at the upper side of the fixed portion 18 of the stand 16, and is formed in a substantially circular tube shape. The axial direction of the support shaft 20 is approximately aligned with (along) the up and down direction. The support shaft 20 is provided with a large diameter portion 22. An axial direction lower end portion of the large diameter portion 22 is joined to the fixed portion 18, and a tapered portion 24 is provided at the axial direction upper side of the large diameter portion 22.

The tapered portion 24 is provided coaxially with the large diameter portion 22 of the support shaft 20. The axial direction lower end of the tapered portion 24 is joined to the axial direction upper end of the large diameter portion 22. A diametric dimension of the tapered portion 24 decreases toward the axial direction upper side. A small diameter portion 26 is provided at the axial direction upper side of the tapered portion 24. The small diameter portion 26 is provided coaxially with the large diameter portion 22 and tapered portion 24 of the support shaft 20. A diametric dimension of the small diameter portion 26 is smaller than the diametric dimension of the axial direction upper end of the tapered portion 24.

A plural number of engaging grooves 28 are provided in the support shaft 20 of the stand 16. The engaging grooves 28 are formed in the large diameter portion 22 in an axial direction upper side portion thereof relative to an axial direction middle portion thereof, and in the tapered portion 24, of the support shaft 20. The engaging grooves 28 are arranged with a predetermined spacing therebetween in the circumferential direction of the support shaft 20, and are formed in long, linear shapes in the axial direction of the support shaft 20. The engaging grooves 28 open out at a radial direction outer side face of the large diameter portion 22 and a radial direction outer side face of the tapered portion 24 of the support shaft 20.

A case 30 that serves as a rotating member structuring a viewer is provided at the stand 16. The case 30 is disposed on the fixed portion 18 of the stand 16. As shown in FIG. 3, the case 30 is accommodated inside a visor 32 that serves as an accommodation member structuring the viewer. The visor 32 is formed in, for example, a substantial box shape that is open toward the vehicle rear side in a state in which the door mirror device for a vehicle 10 is being used during running of the vehicle or the like. A mirror 34 that serves as a viewing member structuring the viewer is disposed inside the visor 32 in the vicinity of the open end of the visor 32. The mirror 34 and the visor 32 are mounted to the case 30 indirectly via other members such as brackets (not shown in the drawings) or the like.

As shown in FIG. 1A, FIG. 1B and FIG. 2, a circular tube portion 36 is formed in the case 30. An axial direction of the circular tube portion 36 is aligned with (along) the up and down direction. The circular tube portion 36 opens out at the upper side end of the case 30. As shown in FIG. 1A and FIG. 1B, an interior floor (middle bottom) portion 38 is formed inside the circular tube portion 36 of the case 30, and a hole portion 40 is formed in the interior floor portion 38 (the interior floor portion 38 is a ring shape seen along the axial direction).

The hole portion 40 of the interior floor portion 38 of the case 30 is formed coaxially with the circular tube portion 36 of the case 30. The axial direction upper end of the hole portion 40 opens out at the upper end of the interior floor portion 38, and the axial direction lower end of the hole portion 40 opens out at the lower end of the case 30. In the state in which the case 30 is disposed on the fixed portion 18 of the stand 16, the large diameter portion 22 of the support shaft 20 of the stand 16 penetrates through the hole portion 40 of the interior floor portion 38 of the case 30, and a portion of the support shaft 20 that protrudes to the upper side beyond the interior floor portion 38 is disposed inside the circular tube portion 36, coaxially with the circular tube portion 36. An inner diameter dimension of the hole portion 40 of the interior floor portion 38 of the case 30 is a little larger than an outer diameter dimension of the large diameter portion 22 of the support shaft 20 of the stand 16. Thus, the case 30 is supported at the support shaft 20 to be rotatable around the support shaft 20.

An engaging ring 42 that serves as an engaging member and structures a restricter is provided on the interior floor portion 38 inside the circular tube portion 36 of the case 30. The engaging ring 42 is formed in a ring shape. The large diameter portion 22 of the support shaft 20 of the stand 16 penetrates through the inner side of the engaging ring 42. The engaging ring 42 is formed of a material that is stiffer and has higher abrasion resistance than the case 30. For example, if the case 30 is formed of a synthetic resin, the engaging ring 42 is formed of a metal such as iron or the like. The engaging ring 42 is equipped with a plural number of lower side protrusion portions 44. The lower side protrusion portions 44 are formed at a predetermined spacing therebetween in the circumferential direction of the engaging ring 42 and protrude to the lower side from a lower side face of the engaging ring 42.

As shown in FIG. 1A and FIG. 1B, a plural number of recess portions 46 (only one of the recess portions 46 is shown in the drawings of FIG. 1A and FIG. 1B) are formed in the interior floor portion 38 of the case 30, to correspond with the lower side protrusion portions 44 of the engaging ring 42. The plural recess portions 46 open out in an upper side face of the interior floor portion 38. The lower side protrusion portions 44 of the engaging ring 42 are inserted (entered) into the recess portions 46. As a result, rotation of the engaging ring 42 relative to the case 30 around a central axis of the engaging ring 42 is blocked.

As shown in FIG. 1A, FIG. 1B and FIG. 2, the engaging ring 42 is equipped with a plural number of upper side protrusion portions 48. The upper side protrusion portions 48 are formed at a predetermined spacing therebetween in the circumferential direction of the engaging ring 42, and protrude to the upper side from an upper side face of the engaging ring 42. At both sides, in the circumferential direction of the engaging ring 42, of each upper side protrusion portion 48, first angled surface portions 50 are formed. The upper side face of each first angled surface portion 50 is an inclined (angled) surface displaced toward the upper side on progress toward the side at which the upper side protrusion portion 48 thereof is disposed.

A restricting ring 52 that serves as a restricting member and structures a restricter is provided inside the circular tube portion 36 of the case 30. The restricting ring 52 is formed in a ring shape, and the large diameter portion 22 of the support shaft 20 of the stand 16 penetrates through the inner side of the restricting ring 52. Mechanical characteristics of the restricting ring 52, such as stiffness, mechanical strength, abrasion resistance and so forth, are approximately the same as mechanical characteristics of the engaging ring 42. For example, if the engaging ring 42 is formed of a metal such as iron or the like, the restricting ring 52 is formed of an equivalent metal.

A plural number of rotation-stopping portions 54 are formed at the restricting ring 52. The rotation-stopping portions 54 protrude to the radial direction inner side of the restricting ring 52 from an inner side face of the restricting ring 52. In the state in which the large diameter portion 22 of the support shaft 20 of the stand 16 penetrates through the inner side of the restricting ring 52, the rotation-stopping portions 54 of the restricting ring 52 are inserted into the engaging grooves 28 of the tapered portion 24 and large diameter portion 22 of the support shaft 20. As a result, rotation of the restricting ring 52 relative to the support shaft 20 is blocked.

Further, a plural number of restricting recess portions 56 are formed at the restricting ring 52. In the state in which the restricting ring 52 is disposed inside the circular tube portion 36 of the case 30, the restricting recess portions 56 are open to the lower side. Both of side faces, in the circumferential direction of the restricting ring 52, of each restricting recess portion 56 are formed as second angled surface portions 58. The lower side face of each second angled surface portion 58 is formed as an inclined (angled) surface that, in the state in which the restricting ring 52 is disposed in the circular tube portion 36 of the case 30, is displaced toward the lower side on progress toward the opposite side, in the circumferential direction of the restricting ring 52, from the side at which an upper bottom (floor) face of the restricting recess portion 56 is disposed.

The upper side protrusion portions 48 of the engaging ring 42 can be inserted inside the restricting recess portions 56 of the restricting ring 52. In the state in which the upper side protrusion portions 48 are inserted into the restricting recess portions 56, the second angled surface portions 58 of the restricting ring 52 abut against the first angled surface portions 50 of the engaging ring 42. In this state, rotation of the engaging ring 42 relative to the restricting ring 52 is restricted.

A push nut 60 is provided at the small diameter portion 26 of the support shaft 20 of the stand 16. The push nut 60 is formed in a ring shape, and the small diameter portion 26 of the support shaft 20 penetrates through the push nut 60. Pawls 62 are formed at the inner side portion of the push nut 60. The pawls 62 are inserted into an annular groove 64 formed at the small diameter portion 26 of the support shaft 20. In consequence, the push nut 60 is retained at the support shaft 20.

A coil spring 66 that serves as a tubular urging member and structures an urger is provided between the push nut 60 and the restricting ring 52. The support shaft 20 of the stand 16 penetrates through the coil spring 66. An axial direction upper end portion of the coil spring 66 abuts against an axial direction lower side face of the push nut 60. An axial direction lower end portion of the coil spring 66 abuts against an axial direction upper side face of the restricting ring 52. Thus, the restricting ring 52 is urged by urging force of the coil spring 66 toward the axial direction lower side of the support shaft 20 of the stand 16, that is, toward the side of the engaging ring 42, the side of the interior floor portion 38 of the case 30, the side of the fixed portion 18 of the stand 16 (the support body side).

A stopper groove 68 that structures a blocker is formed in the case 30. The stopper groove 68 is formed substantially in a "C" shape in a bottom view of the case 30, which shape is formed coaxially with the circular tube portion 36 of the case 30. The stopper groove 68 is formed at the lower side of the interior floor portion 38 of the case 30. In the present exemplary embodiment, the whole of the stopper groove 68 is superposed with the interior floor portion 38, and hence with the restricting ring 52 disposed at the axial direction upper side of the interior floor portion 38, in the axial direction of the circular tube portion 36 (that is, the axial direction of the support shaft 20 of the stand 16, and that is, the rotation axis direction of the case 30). The stopper groove 68 opens out at a bottom face of the case 30, and a stopper 70 is inserted into the stopper groove 68 from the lower side.

Together with the stopper groove 68, the stopper 70 structures the blocker. The stopper 70 is formed to protrude to the upper side from an upper side face of the fixed portion 18 of the stand 16. When a circumferential direction side face of the stopper groove 68 is abutted against the stopper 70 by the case 30 being rotated around the support shaft 20 of the stand 16, the rotation of the case 30 around the support shaft 20 is blocked. Thus, rotation of the case 30 around the support shaft 20 is limited to a predetermined (certain) rotation range. This rotation range of the case 30 is larger than the spacing, in the circumferential direction of the engaging ring 42, between two neighboring upper side protrusion portions 48.

Operation and Effects of the Present Exemplary Embodiment

Now, operation and effects of the present exemplary embodiment are described.

In the present door mirror device for a vehicle 10, the case 30 is rotatable between a "folded (housed) position", at which a reflecting surface of the mirror 34 at the inside of the visor 32 is oriented to the vehicle width direction inner side, and a "forward-angled position", at which the reflecting surface of the mirror 34 is oriented to the vehicle width direction outer side. An "expanded (unfolded) position" (usage position), in which the reflecting surface of the mirror 34 is oriented to the vehicle rear side, is set between the folded position and the forward-angled position in this rotation range of the case 30. In a state in which the case 30 is at the expanded position, the upper side protrusion portions 48 of the engaging ring 42 in the circular tube portion 36 of the case 30 are inserted into the restricting recess portions 56 of the restricting ring 52 (see FIG. 1A). In this state in which the case 30 is at the expanded position, if the visor 32 is to be pushed to a side in the direction around the support shaft 20 of the stand 16, a rotation load is applied to the case 30 toward that side in the direction around the support shaft 20. As a result, the case 30 acts to rotate around the support shaft 20 together with the engaging ring 42.

When the engaging ring 42 acts to rotate around the support shaft 20 of the stand 16, the second angled surface portions 58 of the restricting ring 52 that are at the rotation direction side relative to the restricting recess portions 56 are pushed by the first angled surface portions 50 of the engaging ring 42 that are at the rotation direction side relative to the upper side protrusion portions 48. However, rotation of the restricting ring 52 relative to the support shaft 20 is blocked. Therefore, rotation of the engaging ring 42 around the support shaft 20 is restricted. As a result, rotation of the visor 32 around the support shaft 20 is restricted and the visor 32 can be retained at the expanded position.

When the visor 32 is to be rotated from the expanded position toward the folded position side or the forward-angled position side, a pushing force that exceeds a predetermined magnitude toward the side in the direction around the support shaft 20 is applied to the visor 32. Thus, when a pushing force that is applied to the visor 32 toward the side in the direction around the support shaft 20 exceeds the predetermined magnitude, the second angled surface portions 58 of the restricting ring 52 that are at the rotation direction side relative to the restricting recess portions 56 are pushed by the first angled surface portions 50 of the engaging ring 42 that are at the rotation direction side relative to the upper side protrusion portions 48. Consequently, the engaging ring 42 is rotated to one side around the support shaft 20 and the restricting ring 52 is moved toward the axial direction upper side of the support shaft 20 while being in opposition to the urging force of the coil spring 66 (see FIG. 1B).

Thus, the visor 32 is rotated around the support shaft 20 of the stand 16. When the visor 32 reaches the folded position or the forward-angled position, a circumferential direction side face of the stopper groove 68 of the case 30 is abutted against the stopper 70 of the stand 16. Consequently, rotation of the visor 32 to the opposite side of the folded position from the expanded position and rotation of the visor 32 to the opposite side of the forward-angled position from the expanded position can be prevented.

In the present exemplary embodiment, when the visor 32 is being rotated from the expanded position, the second angled surface portions 58 of the restricting ring 52 are pushed by the first angled surface portions 50 of the engaging ring 42, and the restricting ring 52 is moved toward the axial direction upper side of the support shaft 20 of the stand 16 in opposition to the urging force of the coil spring 66. When the restricting ring 52 is being moved to the axial direction upper side of the support shaft 20, the interior floor portion 38 of the case 30 is subject to the urging force of the coil spring 66 via the engaging ring 42 and the restricting ring 52, and the bottom face of the case 30 is pressed against the upper side face of the fixed portion 18 of the stand 16.

Thus, when the visor 32 is being rotated from the expanded position and when the visor 32 is being rotated toward the expanded position, movements of the case 30 to the upper side and to the lower side can be suppressed. Consequently, when the visor 32 is being rotated from the folded position, separation of the case 30 toward the upper side from the upper side face of the fixed portion 18 of the stand 16 can be suppressed, and a deterioration in appearance caused by separation of the bottom face of the case 30 from the upper side face of the fixed portion 18 of the stand 16 can be suppressed.

In the present exemplary embodiment, the engaging ring 42 that serves as the engaging member is constituted as a separate body from the case 30 structuring the viewer. Therefore, it is sufficient that the engaging ring 42 is provided with mechanical characteristics such as stiffness, strength with respect to forces received from the restricting ring 52 serving as the restricting member, abrasion resistance with respect to friction against the restricting ring 52, and so forth, when the engaging ring 42 is being rotated round the axial direction of the stand 16. Consequently, reductions in weight and the like of the case 30 are possible.

In the present exemplary embodiment, the stopper groove 68 of the case 30 and the stopper 70 of the stand 16 that structure the blocker are provided so as to be superposed with the restricting ring 52 in the axial direction of the support shaft 20 of the stand 16. Thus, the restricting ring 52 and the stopper groove 68 and stopper 70 are disposed to overlap in an axis-orthogonal direction (the radial direction) of the support shaft 20. Therefore, an increase in size of the case 30 and stand 16, and hence of the door mirror device for a vehicle 10, in the axis-orthogonal direction of the support shaft 20 can be suppressed compared to, for example, a structure in which the stopper groove 68 of the case 30 and the stopper 70 of the stand 16 are provided at the outer side in the axis-orthogonal direction (the radial direction) of the support shaft 20 of the stand 16 relative to the restricting ring 52 and the engaging ring 42.

Thus, because an increase in size of the case 30 and the stand 16, and hence of the door mirror device for a vehicle 10, to a side in the axis-orthogonal direction of the support shaft 20 can be suppressed, it is possible that dimensions of the engaging ring 42, the restricting ring 52, the stopper 70 of the stand 16 and the like in the axis-orthogonal direction of the support shaft 20 are increased. As a result, mechanical strengths of the engaging ring 42, the restricting ring 52, the stopper 70 and the like can be assured.

In the present exemplary embodiment, the engaging ring 42 serving as the engaging member and the case 30 structuring the viewer are constituted as separate bodies. However, a configuration is possible in which, for example, structures corresponding to the upper side protrusion portions 48 and first angled surface portions 50 of the engaging ring 42 are formed at the interior floor portion 38 of the case 30, further, a configuration is possible in which, for example, the engaging ring 42 which is a separate body is fixed to the interior floor portion 38 of the case 30.

The present exemplary embodiment has a configuration in which the stopper groove 68 of the case 30 and the stopper 70 of the stand 16 that structure the blocker are superposed in the axial direction of the support shaft 20 of the stand 16 with the restricting ring 52 serving as the restricting member. However, a configuration is possible in which the stopper groove 68 of the case 30 and the stopper 70 of the stand 16 are superposed in the axial direction of the support shaft 20 with only a portion of the restricting ring 52. Furthermore, a configuration is possible in which the stopper groove 68 of the case 30 and the stopper 70 of the stand 16 are not superposed at all with the restricting ring 52 in the axial direction of the support shaft 20.

The present exemplary embodiment has a configuration that is not equipped with a driving unit for rotating the case 30 around the support shaft 20 of the stand 16. However, a configuration is possible in which the case 30 is rotated around the support shaft 20 by driving force from a driving unit such as a motor or the like.

The present exemplary embodiment has a configuration in which the present disclosure is applied to the door mirror device for a vehicle 10. However, the present disclosure may also be applied to a fender mirror for a vehicle, and the present disclosure be applied to an auxiliary mirror for a vehicle that assists viewing of the vehicle's surroundings by a driver of the vehicle. Locations of disposition in the vehicle of the viewing device for a vehicle are not particularly limited.

The present exemplary embodiment has a configuration that enables viewing of the vehicle rear side by reflection at the mirror 34. However, the present disclosure may be applied to a configuration in which an imaging unit employing imaging elements and the like constitutes the viewer, and views to the vehicle rear side or the like that are imaged by the imaging unit are displayed at a monitor provided inside the vehicle or the like. Specific structures for viewing are not particularly limited.

What is claimed is:

1. A viewing device for a vehicle, comprising:
   a support body that is provided at a vehicle body side;
   a viewer that is rotatably supported at the support body, the viewer aiding viewing by an occupant of the vehicle; and
   a restricting member that engages with the viewer from one side in an axis direction of rotation of the viewer and restricts rotation of the viewer, the restricting member being moved to the one side in the axis direction of rotation of the viewer and rotation of the viewer being allowed due to a rotation load of a predetermined magnitude or greater being applied to the restricting member from the viewer,
   wherein:
      the support body is provided with a support shaft that rotatably supports the viewer;
      rotation of the restricting member relative to the support shaft is blocked;
      the restricting member is movable in an axis direction of the support shaft;
      an engaging portion of the restricting member engages with an engaging portion of the viewer from one side in an axis direction of the support shaft and restricts rotation of the viewer, and
      the engaging portion of the restricting member is moved to the one side in the axis direction of the support shaft by rotation of the viewer.

2. The viewing device for a vehicle of claim 1, further comprising an engaging member, wherein: rotation of the engaging member relative to the viewer is blocked; rotation of the engaging member relative to the restricting member is restricted in a state in which the engaging member is engaged with the restricting member; and the engaging member applies the rotation load to the restricting member by the viewer being rotated.

3. The viewing device for a vehicle of claim 1, further comprising an engaging member, wherein: rotation of the engaging member relative to the viewer is blocked; rotation of the engaging member relative to the restricting member is restricted in a state in which the engaging member is engaged with the restricting member; and the engaging member applies the rotation load to the restricting member by the viewer being rotated.

4. The viewing device for a vehicle of claim 3, further comprising a blocker that is provided so as to be superposed with the restricting member in the axis direction of rotation of the viewer, the blocker blocking rotation of the viewer at a certain angle.

5. The viewing device for a vehicle of claim 1, further comprising a blocker that is provided so as to be superposed with the restricting member in the axis direction of rotation of the viewer, the blocker blocking rotation of the viewer at a certain angle.

6. The viewing device for a vehicle of claim 1, further comprising a blocker that is provided so as to be superposed with the restricting member in the axis direction of rotation of the viewer, the blocker blocking rotation of the viewer at a certain angle.

* * * * *